United States Patent [19]
Cardner

[11] Patent Number: 5,402,333
[45] Date of Patent: Mar. 28, 1995

[54] SYSTEM AND METHOD FOR IMPROVING MODEL PRODUCT PROPERTY ESTIMATES

[75] Inventor: David V. Cardner, Orange, Tex.

[73] Assignee: E. I. Du Pont de Nemours & Co., Inc., Wilmington, Del.

[21] Appl. No.: 898,603

[22] Filed: Jun. 15, 1992

[51] Int. Cl.6 .............................................. G05B 13/04
[52] U.S. Cl. .................................... 364/151; 364/164; 364/510
[58] Field of Search ............... 364/151, 153, 164, 554, 364/510

[56] References Cited

U.S. PATENT DOCUMENTS

| | | | |
|---|---|---|---|
| 3,601,588 | 8/1971 | Bristol, II | 364/151 |
| 3,828,171 | 8/1974 | Griffin | 364/151 |
| 4,038,531 | 7/1977 | Loe, Jr. | 364/151 |
| 4,197,576 | 4/1980 | Sanchez | 264/164 |
| 4,249,238 | 2/1981 | Spang, III et al. | 364/151 |
| 4,368,510 | 1/1983 | Anderson | 364/151 |
| 4,437,045 | 3/1984 | Mitsuoka | 364/151 |
| 4,852,053 | 7/1989 | Turrie | 364/151 |
| 5,038,269 | 8/1991 | Grimble et al. | 364/148 |
| 5,043,863 | 8/1991 | Bristol et al. | 364/165 |
| 5,166,873 | 11/1992 | Takatsu et al. | 364/151 |

FOREIGN PATENT DOCUMENTS 8501807  4/1985  WIPO .......................... G05B 13/04

OTHER PUBLICATIONS

Ardell et al., "Model Prediction for Reactor Control", CEP, Jun. 1983, pp. 77–83.
Peter Lawrence, "Data Feedback–The Tuning to Keep Your Control System on Song", Process Engineering, Aug. 1984, pp. 35–36.
Peter Lawrence, "More Control from Your Control", C & I, Sep. 1984, pp. 61–67.
Lutcha et al., "Analysis of Measured Plant Data Based on a Steady State Mathematical Model", The Institution of Chemical Engineers, Symposium Series No. 92, Mar.-/Apr. 1985, pp. 111–120.
(List continued on next page.)

Primary Examiner—Paul Gordon
Attorney, Agent, or Firm—Sterne, Kessler, Goldstein & Fox

[57] ABSTRACT

The present invention is a system and method for improving stream composition and/or product property estimates from process models, which better reflect the true conditions of the process. One or more process simulation models are run on a computer in parallel with the actual process to provide estimates of stream composition and/or product properties to be used to control the process. Adjustments are made to the models to maintain them in alignment with continuously measured key process variables that are closely related to stream composition and/or product properties where such a relationship exists. This greatly improves the ability of the model to track the actual process. Additional adjustments are made to both the models and to the model estimates based on differences between measured and calculated stream composition/product properties. The combination of model calibration adjustments and direct correction of model estimates greatly improves the accuracy of the stream composition/-product property estimates. Adjustments are made to model input variables and model parameters through use of controllers acting on the difference between measured and calculated properties. Differences obtained using relative error or the logarithm of the ratio of the measured and calculated values produce improved adjustments of component concentrations at low concentrations. Artificial measurements of stream composition and/or product properties can be synthesized by combining model composition estimates and flows at two or more locations in the process with an analytical measurement to produce and artificial analytical value at a second location in the process.

33 Claims, 5 Drawing Sheets

OTHER PUBLICATIONS

Iordache et al., "Performance Studies of the Measurement Test for Detection of Gross Errors in Process Data", *AIChE Journal*, vol. 31, No. 7, Jul. 1985, pp. 1187–1201.

Tamhane et al., "Data Reconciliation and Gross Error Detection in Chemical Process Networks", *Technometrics*, vol. 27, No. 4, Nov. 1985, pp. 409–422.

Stephenson et al., "Reconciliation of Process Data with Process Simulation", *AIChE Journal*, vol. 32, No. 2, Feb. 1986, pp. 247–254.

E. D. Gilles, "Model–Based Techniques for Controlling Processes in Chemical Engineering", Proceedings IFAC 10th World Congress on Automatic Control, vol. II, Section 1.3-2, Jul. 1987, pp. 256–270.

Cameron Crowe, "Observability and Redundancy of Process Data for Steady State Reconciliation", *Chemical Engineering Science*, vol. 44, No. 12, 1989, pp. 2909–2917.

Bandoni et al., "On Data Reconciliation with Simultaneous Adjustment of Measures and Functional Model Coefficients", *Computer Applications in Chemical Engineering*, 1990, pp. 369–374.

Ragot et al., "Detection and Location of Gross Errors in Instruments Using Parity Space Technique", *Intl. Journal of Mineral Processing*, vol. 31, 1991, pp. 281–299.

Darouach et al., "Data Reconciliation in Generalized Linear Dynamic Systems", *AIChE Journal*, vol. 37, No. 2, Feb. 1991, pp. 193–201.

Nair et al., "Rigorous Data Reconciliation is Key to Optical Operations", *Control*, Oct. 1991.

SYSTEM AND METHOD FOR IMPROVING MODEL PRODUCT PROPERTY ESTIMATES

CROSS REFERENCE TO PATENT APPLICATIONS

The present application is related to the following concurrently filed patent application, assigned to the Assignee of the present application:

U.S. patent application 07/898,864, filed on Jun. 15, 1992 by David V. Cardner, entitled "SYSTEM AND METHOD FOR IMPROVED FLOW DATA RECONCILIATION", which is hereby incorporated by reference in its entirety.

BACKGROUND OF THE INVENTION

1. Field of the Invention

The present invention relates a system and method for producing product property estimates for closed-loop control processes and, more particularly, to a system and method for estimating process stream compositions and/or product properties from process models, and for improving those estimates, and the application of the improved estimates to control of the process.

2. Discussion of Related Art

Chemical, petrochemical, and polymer products are usually manufactured through a series of operations. Each of these operations is performed by equipment especially designed to achieve specified exit stream compositions and/or product properties. The entire sequence of operations result in the production of one or more product streams which must meet prescribed stream composition and/or product property specifications. Even byproduct or waste streams must meet specifications that generally limit the amount of useful product purged.

Industry has been very successful in automating the equipment regulatory control function. Control of pressure, temperature, level and flow produces stable and predictable operation of most process operations and can be most effectively applied through use of a modern distributed control system.

However, control of stream composition and/or product properties (stream quality measures) is still largely a manual operation that is performed by the operator after his evaluation of analyzer or laboratory results. Attempts to automate stream composition and/or product property control using laboratory or processors analyzers have been largely unsuccessful due to reliability and accuracy limitations, or because of cost factors.

Conventional techniques have taught that these problems may be overcome to a large extent by utilizing computer models of the process to compute stream quality Values, and then using the computed values for closed loop control. Computer models are relatively inexpensive, highly reliable, and can be run frequently, so that time delays are of little consequence. When properly designed, they require little maintenance.

Process computer models operating in parallel with the actual process can convert feed composition measurements, and pressure, temperature, level, and flow measurements for a particular operation into exit stream composition and product property estimates.

There are several requirements imposed by the use of process models:

(1) The accuracy and reliability of the input process variables to the process models (feed composition, pressure, temperature, level, and flow) must be assured. Erroneous input values may produce significant errors in the output results, thus rendering them useless.

(2) The estimates of stream composition and/or product properties produced by the process model must remain in reasonable agreement with calibrated analyses. The calibrated analysis may be from the process laboratory or a process analyzer. If the model cannot provide reasonable estimates of stream quality, then it is of little value.

(3) Simulation of a process involving one or more operations is usually most accurately represented over wide operating ranges by detailed first principles models based on energy and material balance relationships for each of the operations. Such models may be defined in terms of several thousand differential equations (variables), and tens of thousands of algebraic relationships.

(4) When dynamic models of the process are used to simulate process operations, then the dynamic models must run faster than real time if they are to faithfully track the process.

(5) When steady-state models of the process operation are used, then the process operation must reach steady-state with respect to exit stream quality measures within a relatively short time span. Steady-state models will not accurately estimate component concentrations or product properties in process operations with long holdup times.

Both steady-state and dynamic models can be applied to separate operations within a process to produce an overall process simulation.

The use of dynamic models creates the question of how frequently to reinitialize the models with new input information. If the models are reinitialized at high frequency (e.g., several times per minute), then the time increment for the integration is kept very short. This provides very close tracking of the process, but severely limits the complexity of the model and the extent of input data reconciliation and calibration of model output because of time limitations.

On the other hand, if the frequency of reinitialization is reduced significantly (e.g., to several times each hour), then much more extensive and detailed models can be used to provide a broader and more realistic simulation of the entire process operation, although high frequency detail may be missing.

Conventional techniques emphasize reinitialization at a high frequency and integration for very short time increments using very limited models that incorporate limited or no input data reconciliation, and simple model output corrections. However, these techniques have their limitations, as outlined below.

Dynamic models used for process control are typically quite limited in size and consist in most cases of less than a dozen differential equations. These are typically designed to control a single process .or quality variable. These models are usually part of a sophisticated controller that cycles at high frequency to achieve close tracking of a process. This modeling approach isn't practical for modeling complex operations such as a multi-component distillation column, or any other process that has multiple components and requires numerous differential equations to be accurately modeled.

Large scale steady state models have been applied to processes successfully under certain conditions where the process has been close to steady state. However, steady state models are highly unreliable in predicting trace impurity levels in systems with long component response times, and would be inappropriate for simulating in real time a large scale distillation operation involving high purity streams with low impurity levels. They can also produce very poor estimates of product properties and/or stream composition during transients caused by changing operating rate or feed composition.

As discussed above, conventional techniques teach that models should incorporate all relevant elements of the process into a single model. This greatly limits the ability to model large processes. Use of several loosely coupled models to describe several operations within a process greatly increases the reliability of the individual models in tracking the process stream composition and/or product properties. This approach also allows for the use of both dynamic and steady state models to describe different operations in the process.

It has previously been suggested that only model output should be corrected and that neither model parameters nor model input should be adjusted. This may be satisfactory for small linear models, but large scale, nonlinear, multi-component models often tend to diverge without direct control of the model through adjustment of model parameters or input signals.

Conventional techniques, as illustrated by the Kalman filter design, utilize a combination of statistical filtering, alignment, and calibration that attempts to take into account all of the interactions among the state variables and expresses this in the covariance matrix. Since the number of elements in the covariance matrix is the square of the number of state variables, it is obvious that the number of state variables, and thus the number of differential equations, that can be handled is limited.

The art teaches that differences between measured and computed values are best determined as arithmetic differences. Under certain conditions these differences, if used directly to correct a model output, might actually produce negative concentrations or product property values.

Dynamic modeling of processes has previously been formulated in a way that makes it very difficult to incorporate process information several hours old into the current calculations. In some cases the approach has been to reinitialize the model at the time the sample was taken, incorporate the new information, and then recalculate the process trajectory from then till current time. This is not a practical approach when considering simulating a large process operation, such as an entire distillation refining train.

SUMMARY OF THE INVENTION

The present invention provides a system and method for improving the accuracy and precision of stream composition and/or product property estimates produced by process simulation models run in parallel with the process. The general approach of the present invention is to use an assortment of techniques singly, or in combination, on each model and each product stream where appropriate.

One technique keeps the models in alignment with the process. This involves comparison of process measurements with computed values of key regulatory variables to produce corrective signals that are used to minimize the error between measured and computed values of the regulatory variables through adjustment of model parameters, model input signals, and/or model output signals.

A second technique provides calibration of the model. This involves the comparison of model stream quality estimates with measured values to produce stream quality corrective signals that are used to minimize the difference between measured and computed output quality signals through adjustment of model parameters, model input signals, or model input quality signals.

A third technique calibrates model output quality estimates directly by applying the stream quality corrective signals directly to model computed output quality signals to produce improved output quality signals.

A fourth technique uses the quality measure corrective signal to cause adjustments to the alignment function.

The preferred embodiment of the present invention is a computer-based system referred to herein as "the process autopilot". The process autopilot is a system for performing closed-loop composition and product property control in any manufacturing process handling flowable materials such as liquids, vapors, gases and flowable solids. Examples are chemical manufacturing process plants, refineries, or polymer processing plants.

For closed loop stream composition or product property control to be successful, each stream component or product property to be controlled must be estimated frequently and accurately, and with a high level of reliability. Various aspects of the present invention are used to process raw flow measurement signals to produce corrected flow measurement signals, which can then be used as inputs to simulations which provide the needed frequent, accurate, reliable estimates of stream compositions or product properties.

BRIEF DESCRIPTION OF THE DRAWINGS

The above and further advantages of this invention may be better understood by referring to the following description taken in conjunction with the accompanying drawings, in which.

DETAILED DESCRIPTION OF THE INVENTION

The preferred embodiment of the present invention is a computer-based system referred to here as "the process autopilot". The process autopilot is a system for performing closed-loop composition and product property control in any manufacturing process handling flowable materials such as liquids, vapors, gases and flowable solids. Examples are chemical manufacturing process plants, refineries, or polymer processing plants.

For closed loop stream composition or product property control to be successful, each stream component or product property to be controlled must be estimated frequently and accurately, and with a high level of reliability. Various aspects of the present invention are used to process raw flow measurement signals to produce corrected flow measurement signals, which can then be used as inputs to simulations which provide the needed frequent, accurate, reliable estimates of stream compositions or product properties.

The preferred embodiment is named process autopilot because it performs closed-loop stream composition or product property control in a plant with one or more unit operations. This fully automates the process so that it no longer requires operator intervention during normal operation.

The preferred embodiment is best employed in control of multi-unit continuous process operations. However, the system can be applied to batch operations, which are continuously varying operations that are usually performed in a single process unit.

As employed herein, "product properties" are measured or computed physical or chemical characteristics of any process material. Properties might be inherent in the material or indicative of their end-use performance. The term "product properties" generally means stream composition when applied to liquid or vapor streams in the chemical industry. In petroleum refining operations where the number and types of components may become too numerous to define, product properties may be characterized by property measurements such as: cut-point temperature, flash point, and Reid vapor pressure. Product properties for solid streams usually refer to properties such as: melt index, molecular weight distribution, and particle size distribution. Product properties can also be end-use characteristics of a product, such as the sheen produced when a pigment is used to make a paint, or the knocking behavior of gasoline.

The equipment regulatory variables—pressure, temperature, level, and flow (designated PTLF variables)—are controlled to maintain process equipment operating at a designated stationary state, regardless of disturbances to the inputs. Certain PTLF variables may also be adjusted by the operator to move the process equipment to another stationary state (e.g., to increase production) while other PTLF variables are held constant in order to maintain the desired stream composition and/or product properties.

Figure 1:
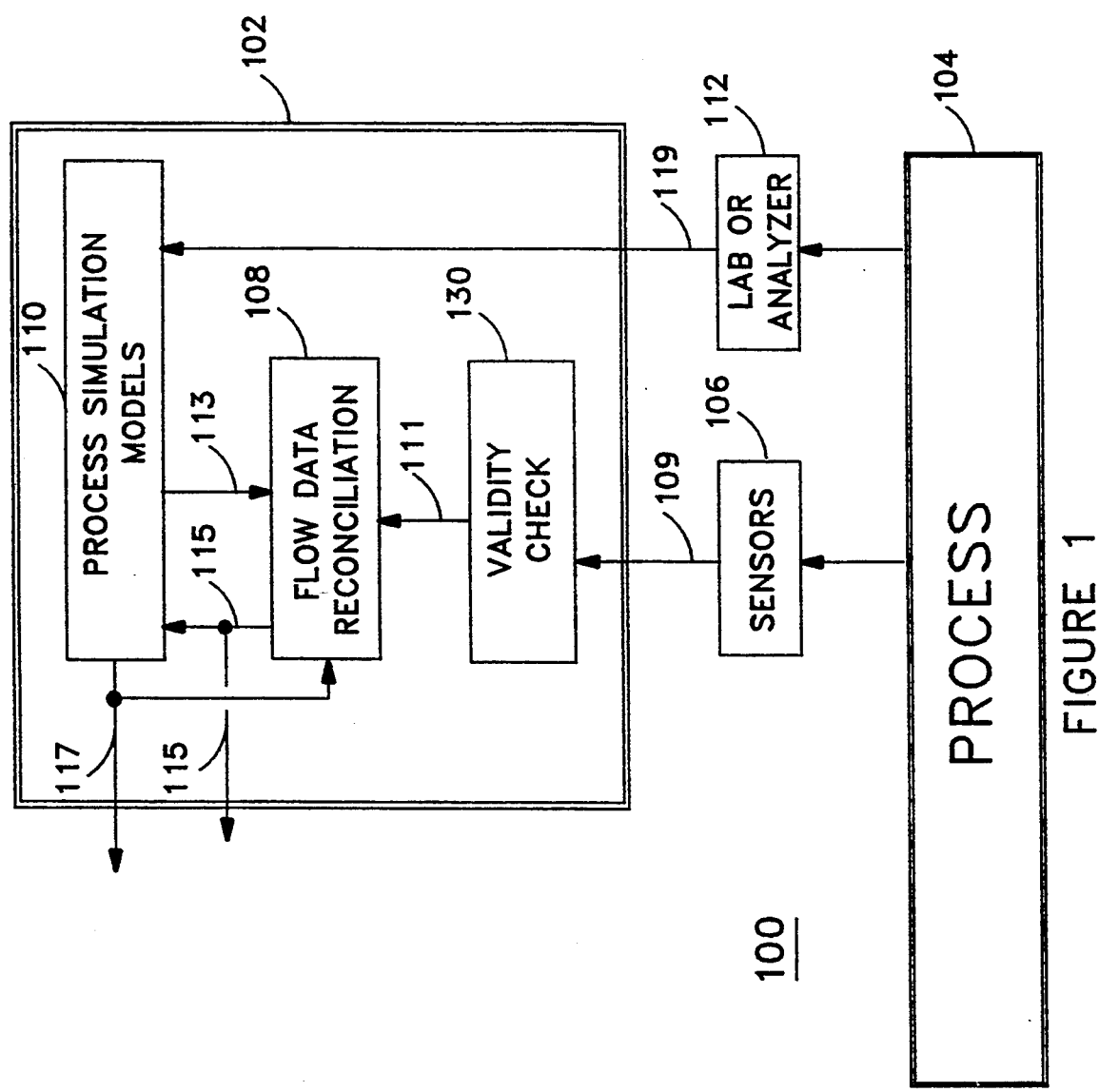
FIG. 1 shows a diagram of a computer based flow data reconciliation system.

FIG. 1 illustrates a flow data reconciliation system 100. The system 100 operates on a process 104. The present invention is applicable to any process 104, including chemical processes, refineries, and polymer processes. Often the material in the process can be treated as a fluid, including viscous polymers and finely divided solids, which are moved within the process in streams. A process is normally made up of more than one unit, where each unit carries out some specific processing function, such as reaction, distillation, or heat exchange. Units interconnect via streams.

Figure 2:
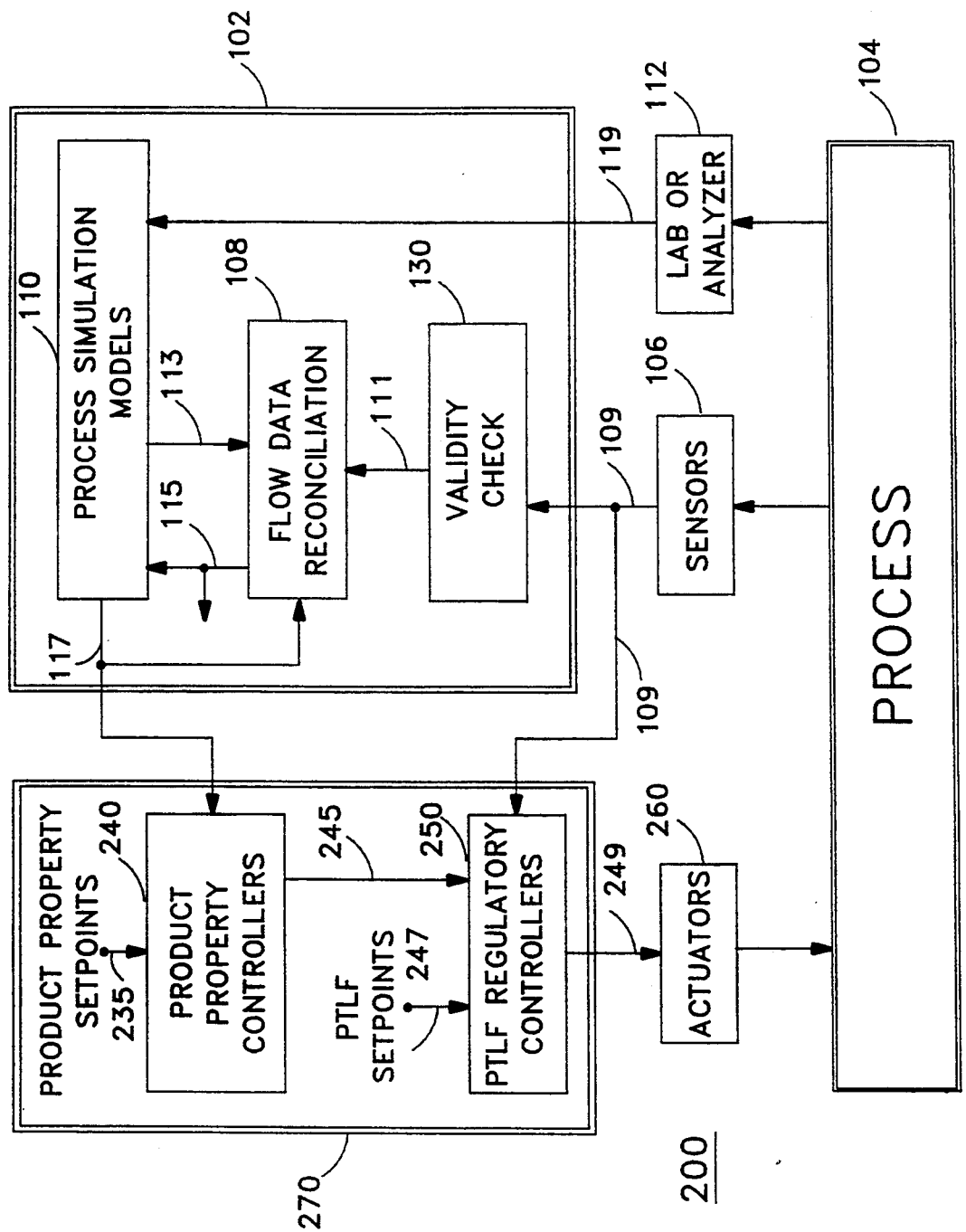
FIG. 2 shows a block diagram of a computer-based flow data reconciliation system and product property control system.

In the presently preferred embodiment of the present invention, the process simulation models 110 and the flow data reconciliation module 108 are implemented on a digital computer. In one interpretation, block 102 may be viewed as the computer platform on which these two modules are implemented. In addition, as shown in FIG. 2, the data flow reconciliation system 102 is used in combination with a product property control system 270. In the presently preferred embodiment, the product property control system includes the product property controllers 240 and PTLF controllers 250, both of which are implemented in a distributed control system (DCS). The product property controllers 240 and PTLF controller 250 are both well known in the art. Block 270 can be interpreted as showing the DCS as a platform for these modules.

Figure 5:
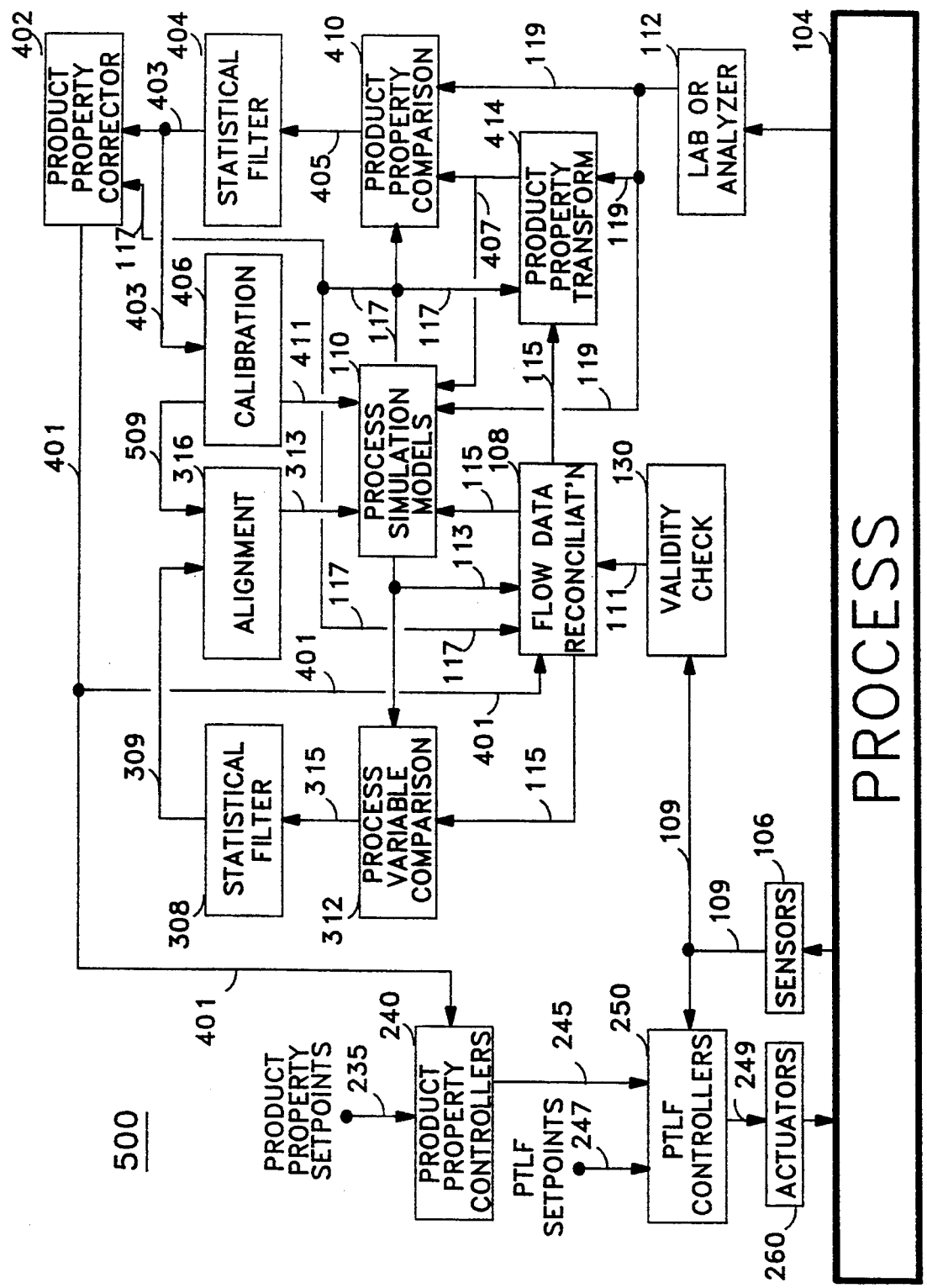
FIG. 5 shows a block diagram of the preferred embodiment of the invention implemented as a computer based process stream composition and product property control system.

FIG. 5 shows a schematic diagram of the preferred embodiment of the present invention (process autopilot) as a computer-based stream composition and product property control system. In the process autopilot, all of the computer-based modules 402, 404, 410, 414, 406, 316, 110, 130, 108, 308 and 312 are implemented on a common computer, a PDP-11. It should be understood, however, that any number and nature of computer platforms, and any distribution of modules among them is contemplated by the present invention, as long as the signals in the invention (odd numbered in the drawings) can be communicated via analog or digital means between the modules.

I. Flow Data Reconciliation

In the following discussion, the terms model, simulation, and simulation model may be used. These terms have the same meaning, and refer to computer-based predictors 110 which utilize engineering and scientific principles to compute desired values from known values. These models are also referred to as first principle models.

Referring again to FIG. 1, the process simulation models 110 compute predicted product property signals 117 that can be used to provide closed-loop product property or composition control of the process, as well as for other procedures within the process autopilot. The process simulation models 110 also provide estimates of PTLF variables 113 used by other process autopilot functions. The predicted flow values 113 are used in completing balances in the flow data reconciliation procedure.

Input to the simulation models 110 consists of reconciled (corrected) flows, temperatures, pressures, and levels 115 and input property values, which can be measured 119 or estimated (not shown), and may include reconciled composition values 115. In addition, to initialize the process autopilot, a priori estimated flow measurement values are used to generate initial simulation results. This is the first step used to initialize the process autopilot.

The preferred method of simulation is with a dynamic, first-principles model for each unit operation in the process. First principles simulation of chemical processes is well known in the art. Any method of modeling, either analytic or numerical, can be used. Numerically solved models are typically used because they can model a much wider range of process units.

The simulations should use a computation cycle much shorter than the process response time. When the process dynamics are faster than the fastest possible computation cycle, the process appears to be at steady-state and a steady-state first-principles model is adequate. In this case all inventory rate-of-change factors are zero. The more general case of dynamic simulation will be discussed next.

The models 110 can use three types of input. First, they must be provided with the most recent measurement signals of pressure, temperature, level, and flow 115. The flow values are preferably reconciled (corrected) signals 115 (except for initialization, when raw signals 109 or estimates are used), and preferably the pressure and temperature values should be limit checked.

The second type of input is feed composition or feed properties 119. These can be provided from lab or analyzer 112, or computed sources.

Third, the simulation models 110 may optionally accept adjustments to model calibration and to alignment factors. Model calibration adjustments change model parameters, such as tray efficiency for distillation columns or catalyst activity for reactors, or biases model flows. This is done to make the model more accurately reproduce measured product property or stream composition values. Continual recalibration of the models compensates for changes in the process behavior relative to the model behavior. Alignment keeps the models in synchronization with the process by matching equipment PTLF regulatory variables.

The models are run on a fixed frequency, in which each run simulates a given time period of operation of the plant. For example, the models may be run every five minutes to simulate five minutes of plant operation. A process may have several process steps and be represented by several models, which can be run independently of each other with respect to flows. Each model is independently initialized with respect to flows, temperatures and pressures for each computation cycle using reconciled values from the process. Since flow values are not transferred between models, they can be manipulated by the calibration and alignment function without affecting downstream models. Usually, only composition values are transferred between the models. This method of decoupling the models greatly enhances the ability to accurately and reliably track product property values across a multi-unit process.

The validity check module 130 first inputs the raw sensor measurement signals 109 (which include flow measurement signals and signals from other types of sensors such as pressure). These signals are screened against high and low limits to detect gross errors, and default values are substituted should they occur. This produces validated raw sensor measurement signals 111 (which include validated raw flow measurement signals), which are used by the flow data reconciliation module 108.

The flow data reconciliation module 108 provides improved flow measurement signals for use by the process simulation models 110. This is important since an inaccurate flow measurement signal value could cause substantial inaccuracy in the computed product properties, resulting in improper control, production of off-specification product, and resulting ingredients and energy waste, and lost production opportunity.

A number of aspects of the flow data reconciliation are configured in accordance with the known process. The balances used in the reconciliation are configured to match the process connections for each process unit. Also, an error weight may be entered for each flow measurement signal. A low weight indicates an expectation that a signal will be inaccurate. A high weight indicates an expectation that a signal will be accurate.

The flow data reconciliation module 108 uses validated raw flow measurement signals 111, simulated (predicted) pressure, temperature, level, and flow measurement signals 113 and rate of change of inventory signals 113 from the dynamic simulation 110. The reconciliation module 108 uses dynamic mass, energy, and/or component balances around each unit (of process 104) that describe the overall energy and material balances for that unit. For those process steps where the rate of change of equipment inventory is significant, validated measurements 111 or estimates 113 of the rate-of-change of inventory are incorporated into the energy and material balance relations.

The flow data reconciliation module 108 first inputs predicted pressure, temperature, level, and flow measurement signals 113 and optionally predicted product property signals 117 from the process simulation models 110 sufficient to satisfy all of the data requirements of the reconciliation method. Then, all available validated raw flow measurement signals 111 are used to replace the corresponding predicted signals. Unmeasured flows and other unmeasured variables are thus estimated directly by the process simulation model 110. A calculation to determine the enthalpy of each stream is then performed. This produces a complete flow data reconciliation model data set, which is used by the flow data reconciliation module 108.

Moreover, the flow data reconciliation module 108 corrects flow values using the mass and energy balances around each unit, using the following steps. First, a starting correction factor (close to 1.0) is chosen for each flow signal and each inventory accumulation term, such that the sum of all flows and inventory accumulation terms times their correction factors equals zero (i.e., the balance is satisfied around the unit). The correction factor for each flow signal is subtracted from 1.0 to produce an error signal, squared, and then multiplied by two weights; a weight reflecting the degree of confidence in the measurement, and a weight that reflects the degree of correction required for the flow. The weighted squared errors are summed to give a sum of weighted error values.

The mass and energy balances constitute the equality constraints, and the sum of weighted error values is the objective function to be minimized by adjusting the correction factors for each flow signal. The solution may be obtained using quadratic or non-linear programming algorithms or other techniques described in the art.

If component balances with corrections to component concentrations are included as additional balance equations, and/or correction factors are applied to stream enthalpies, then the equality constraints become non-linear and non-linear programming methods or other special methods in the art must be utilized to minimize the sum of weighted error values, while continuing to satisfy the balance relationships (equality constraints) around each unit.

A non-linear programming algorithm is utilized in the preferred embodiment to minimize the sum of weighted error values.

When a converged solution is obtained, each correction factor is compared with its previous moving average correction factor using the below described procedure for statistical filter 404. If this comparison detects a major change in one or more correction factors, then new variable weights for those terms in the sum of weighted error values are generated and the reconciliation process repeated until all correction factors fall within a prescribed range of the moving average correction factor (normally 5 deviations), or the maximum number of iterations is reached, or the time limit is exceeded.

When the final converged solution is obtained, then new estimates of the moving average correction factors are generated by combining the old moving average correction factor with the new value in an exponentially weighted filter.

If a flow signal is found to have an extreme correction factor, meaning the flow is being adjusted significantly, the variable weight on the weighted squared error term is reduced. This effectively discounts the sensor signal, and causes that correction factor to absorb more correction while other correction factors are changed little.

On completion of the reconciliation, new moving average values of the correction factor on each flow signal and new moving average variances are computed and saved, along with the updated values for the variable weight applied to the terms in the sum of weighted error values.

This procedure is performed for each computational cycle of the process autopilot, which may be several times per hour. The frequency depends on the time constant of property dynamics of the process, and must be frequent relative to the time constant. For example, one estimate of the time constant is how long it takes the product property, in response to a step change in a regulatory setpoint (which affects that property), to move halfway to its new steady state value.

The flow data reconciliation module 108 produces a corrected set of pressure, temperature, and flow signals 115 as input to other process autopilot procedures. If composition reconciliation is also performed, reconciled input compositions 115 are also available.

Referring to FIG. 2, PTLF equipment regulatory controllers 250 can operate as single-loop, cascade or other types of controllers as known in the art. Fluid handling equipment can operate over relatively wide ranges of pressure, temperature, level, and flow. These variables, as measured by sensor signals 109, must be carefully controlled to provide stable, predictable operation of the process equipment at the correct operating rate. Normally, automated control of these variables is easily achieved, primarily because accurate sensors 106 are available that provide continuous signals to automatic controllers 250.

The PTLF controllers 250 regulate pressure, temperature, level, and flow to provide stable, predictable operation of the process equipment at their setpoint values 245, 247. Some PTLF controllers receive controller setpoint adjustments 247 only from the operator, while others can also receive their setpoint adjustments 245 from product property controllers. The PTLF controllers 250 send output signals to actuators 260, such as valve loadings to control valves, to maintain the PTLF variables as close to setpoint as possible. Examples of PTLF variables that do not significantly influence product properties are condensate pot level, storage tank pressure, and condenser exit water temperature. Examples of PTLF variables that often affect product properties are fixed-bed reactor inlet temperature, calandria steam flow on a distillation column, and reflux ratio on a distillation column.

In the preferred embodiment, PTLF controllers 250 are implemented using a distributed control system. However, any implementation, such as analog pneumatic controllers, could be used.

The setpoints 245 for some PTLF controllers 250 may be adjusted by an operator after examination of analytical results 119 from a process analyzer or laboratory analysis 112.

Alternatively, automatic product property control can be implemented by providing measured product property signals 119 or predicted product property signals 117 or 401 to product property controllers 240 that automatically adjust the setpoints 245 of the PTLF controllers 250. Effective automation requires product property measurements 119 or estimates 117 or 401, which are accurate, reliable, and produced frequently relative to the speed of process changes. The operator adjusts, as shown in reference number 235, the product property setpoints to match the product property specification of the product that is being produced.

In the preferred embodiment, product property controllers 240 are implemented using a distributed control system. However, any implementation, such as analog pneumatic controllers, or a computer-based supervisory control system could be used.

II. Calibration and Alignment System and Method

One feature of the present invention is a system and method for improving the accuracy and precision of stream composition and/or product property estimates produced by process simulation models run in parallel with the process 104. The general approach of the present invention is to use an assortment of procedures singly, or in combination, on each model and each product stream where appropriate. One procedure keeps the model in alignment with the process by minimizing the errors between computed and measured values of key regulatory variables. A second procedure calibrates the model by adjusting the model parameters, or input flow or composition signals, to minimize the difference between measured and calculated output quality signals. A third procedure adjusts the model output property signals 117 directly. A fourth procedure adjusts alignment controllers 316. The objective of all four procedures is to minimize the error between measured and computed stream compositions and/or product properties.

A. Calibration

Figure 4:
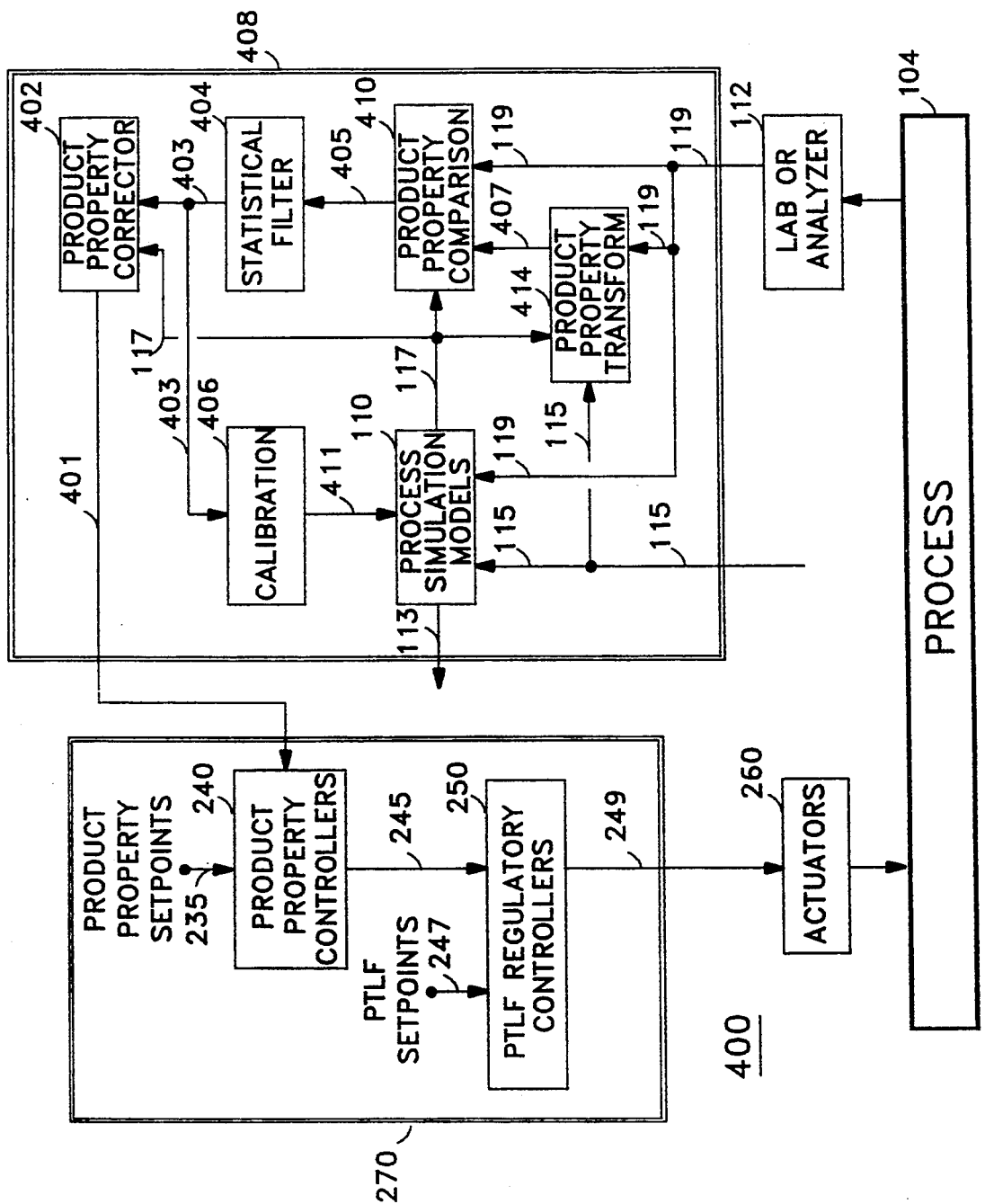
FIG. 4 shows a block diagram of the invention implemented as a computer based model calibration and product property correction and product property control system.

FIG. 4 shows a block diagram of a computer-based model calibration and product property correction and product property control system. The calibration system 408 is based on comparing computed and measured stream compositions and/or product properties. Adjustments based on the difference are then applied to the models 110, the model estimates 117, and/or the alignment system 318.

Product property signals 119 are made by on-line or in-line analyzers 112, or by extracting a sample from the process and analyzing it in a laboratory (also shown as 112). Both methods produce a product property measurement signal 119. In-line analyses produce continuous measurements. Analyses from on-line sample-based analyzers typically vary in frequency from every few minutes to several hours. Laboratory analyses typically vary in frequency from several hours to once each day.

The product property signals 119 are indicative of the actual stream compositions and product properties of process 104. Any analog product property signals 119 are converted to digital signals and input with other digital product property signals to the calibration and product property corrector system 408. A first principles simulation 110 of the process is carried out on the computer using the reconciled flows and validated pressure, temperature, and level measurements 115, and feed composition values in signal 119. The simulation 110 produces stream composition and/or product property estimates 117 that are introduced into the product property comparison 410.

In processes with several process operations, not all streams exiting each process operation are analyzed. Usually final product streams (main product and waste streams) are analyzed. It is often possible, using simple material balance calculations, to estimate the concentration of a single component for one of the interior streams based on the final product stream analysis. The product property transform module 414 performs this function.

The product property transform module 414 utilizes product property measurement signals 119, with reconciled flows 115 and predicted product property signals 117 to produce artificial analyses 407 for streams that normally are not analyzed using component and flow ratios and simple material balance relationships. These are processed along with the normal analyses (product property signals 119) by product property comparison module 410 to produce error estimates 405, which can then be used to automatically recalibrate the appropriate model. Use of artificial analysis greatly expands the capability to maintain the simulation models in calibration.

The product property comparison module 410 computes instantaneous product property errors 405 between measured analytical signals 119 and/or artificial analytical signals 407 and the predicted product property signals 117 computed by the simulation models 110 at the time of the sample.

The instantaneous product property errors 405 can be expressed as arithmetic differences, as arithmetic differences divided by the range of the measured variables, as arithmetic differences divided by the computed or measured value, as the natural logarithm of the computed and measured values, or any combination of the above. The natural log of the ratio is preferred for low concentrations of stream components so that a symmetry in the error is established around the computed value. Either relative error or the log of the ratio can be utilized for higher concentrations.

Proper selection of the method for expressing the error can many times linearize the relationships between the error and the response to the corrective action; thus making corrective actions more accurate over wider ranges of error. The best method often eliminates the possibility of producing unrealistic product property estimates (e.g., negative mole fractions).

The statistical filter module 404 calculates a corresponding product property moving average error 403 each time an instantaneous product property error 405 is calculated. Each instantaneous product property error 405 is treated independently of the others.

The statistical filter module 404 compares the instantaneous product property error signal 405 with the previously determined value for the moving average error signal 403. The difference between the error 405 and the moving average error 403, when squared, is the instantaneous variance. The deviation of the error from the average error, measured in multiples of the average variance, is computed and applied to the normal frequency distribution to determine weighting factors for an exponentially weighted filter. The filter is used to update the moving average error.

The deviation can be applied to the normal frequency distribution to produce an estimate of the probability of occurrence of a larger deviation. If the deviation is large, then the probability of occurrence of an even larger value is low. If the deviation is very small, then the probability of occurrence of a larger deviation may approach 1.0, and the signal is considered to be very accurate.

The probability of occurrence of a larger value is used as a multiplier of the instantaneous product property error 405, and the probability of a smaller value is used as the multiplier of the previous moving average error 403. The two products are added to produce the new moving average error 403.

The statistical filter module 404 calculates a moving average variance each time a new moving average error is calculated. The new average variance is obtained by combining the current value of variance with the previous moving average value of variance in an exponentially weighted filter where the fixed weights are selected by the user.

On occasion, the property signals 119 or 407 may shift quickly to new and substantially different values due to instrument or process changes. This would cause the error signal 405 to also change quickly. Under normal circumstances, the sudden large difference between the error signal 405 and the previous value of the moving average error 403 would cause the new error signal to be treated as being erroneous and would be given little weight in generating a new moving average error 403.

The instantaneous error signals 405 would continue to be heavily discounted until the moving average variance had increased as a results of the repeated large differences. This would normally require many cycles before the moving average error 403 reflected the true error. During this period, the corrections made by the product property corrector 402 would be inaccurate.

This problem is overcome by using a modification of the cusum (cumulative summation) statistical procedure that involves counting the number of consecutive times the deviation exceeds 1.0 (or other threshold value) in the same direction front the moving average error. This count is used as a divisor of the deviation to produce an artificial deviation that is applied to the normal frequency distribution to produce probability factors that weight the current value of error 405 higher and the previous moving average error 403 lower in the filter. This method moves the moving average error 403 to the true value of the error in much fewer steps, while the moving average variance remains relatively undistorted.

Occasionally, the normal variability of process analyzer or laboratory analyses is large and produces a large moving average variance. When this occurs, filtering is inadequate to prevent significant changes in the moving average error 403 with each new analysis, which when used to correct product property estimates causes erratic control of the process.

To reduce this variability, an amplification factor set by the user is applied to the deviation to produce a larger artificial deviation which produces filter weighting factors that weight the previous moving average error 403 higher and the instantaneous error signal 405 lower. This reduces the variability of the new moving average error 403.

The preferred embodiment utilizes an artificial deviation developed by application of both the cusum divisor and the amplification factor, when required.

Occasionally, the calculations will fail for one reason or another. This may produce extremely large errors that do not represent normal operation. It is important to prevent these errors from causing abnormal increases in the moving average variance. One extremely large error can result in distortion of the moving average variance that may last for weeks.

To prevent distortion of the moving average variance due to model failures, the fixed weight multiplying the current value of variance in the filter is divided by the deviation if the deviation is greater than a threshold value. The preferred embodiment specifies a limit of 5. One minus the reduced weight multiplies the previous moving average variance in the filter calculation.

In the case of flow data, reconciliation, the variable weighting factors applied to each term in a sum of weighted squared errors represent the accuracy of the measurement relative to its true value. The further from the true value, the smaller the weighting factor. The function of the variable weighting factor is to allow signals from failed or highly inaccurate sensors to be discounted relative to the accurate measurements. This allows the correction factors for those erroneous signals to absorb essentially the entire correction and thus prevents distortion of the other correction factors.

The preferred embodiment utilizes a variable weighting factor that is the reciprocal of one plus the square of the product of an adjustable constant and the error. Proper choice of the adjustable constant produces a weighting factor that remains relatively high within a band around the average, and then declines rapidly outside that band. Within the preferred embodiment, the adjustable factor is 4.

The variable weighting factors are set prior to the computation that minimizes the sum of weighted error values and are not varied during the computation.

Moving average variable weighting factors may be calculated from the instantaneous weighting factors using an exponentially weighted moving average filter with the weighting factors determined as in the case of the moving average error, but without applying cusum counts or amplification factors. However, in this case, the application of the weighting factors is reversed so that a large deviation will result in heavily weighting the current value, rather than the moving average value, so as to respond immediately to a sudden failure of a sensor.

The filtered difference 403 is introduced into the product property corrector 402 along with the stream composition/product property estimates 117 from the simulation 110 to produce a corrected stream composition/product property estimate 401. The product property corrector module 402 corrects the predicted product property signals 117 by application of the product property average error 403 according to the manner by which it was derived, to produce the corrected product property signals 401, which in turn are used as input to the product property controllers 240 and by the flow data reconciliation module 108.

In the event there is no filtered difference 403 corresponding to a stream composition/product property estimate 117, then the property estimate 117 is passed unchanged through product property corrector 402 as property estimate 401.

The calibration module 406 adjusts the model calibration factors 411 to drive the product error 405 and the product property average error 403 toward zero. The calibration module 406 may also generate setpoint signals 509 for adjusting setpoints of alignment controllers 316.

The preferred method for adjusting calibration factors is through use of the standard PID control procedure, which can be tuned to avoid changing the calculated product properties to the extent that they alter the operation of the plant significantly, while still obtaining a reasonable adjustment rate. Other types of control procedures, such as lead-lag and dead time compensation, may be employed if their use is appropriate for the situation.

The control procedure can be triggered two ways. Usually, the model calibration parameters are updated only when a new analytical value is measured. In some cases it may be desirable to trigger the control procedure each calculation cycle to move the model toward the last measured value much more quickly, but without upsetting the process.

B. Alignment

Figure 3:
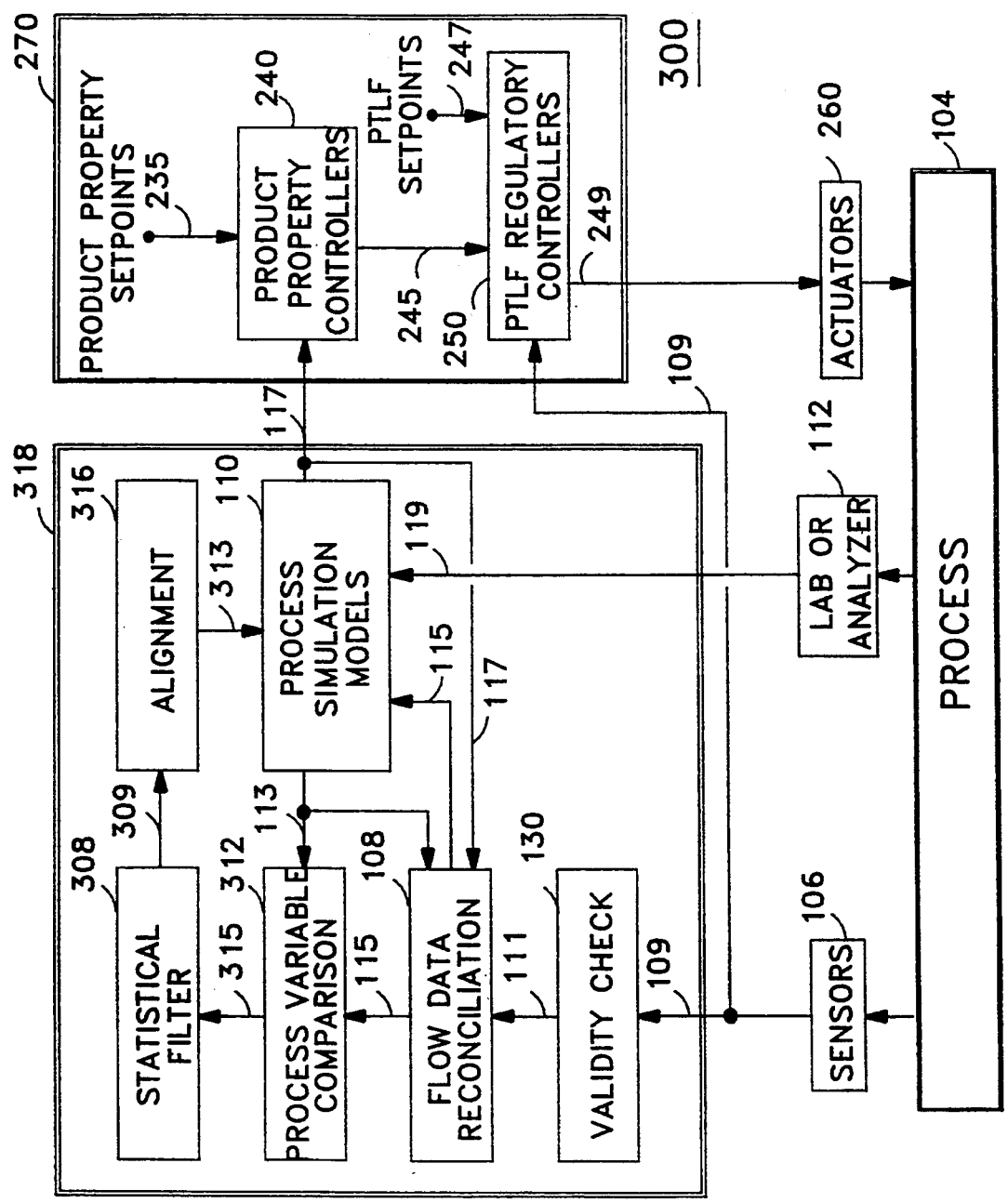
FIG. 3 shows a block diagram of the invention implemented as a model alignment and product property control system.

FIG. 3 shows a block diagram of a model alignment system 318 and property control system 270. The alignment system 318 utilizes comparisons between measured and computed values of the process variables, normally temperature and pressure to produce corrective action that drives the differences toward zero. The corrective action usually involves adjusting a selected flow, or model parameter.

Sensors 106 are used to generate raw pressure, temperature, level and flow measurement signals 109 from process 104. Temperature and pressure are normally the variables sensitive to stream composition and/or product property variations. The alignment system 318 provides a means for keeping a model in alignment with the process whenever pressure and/or temperature are composition sensitive. Either temperature is maintained by the model and the alignment function maintains pressure by biasing flows or feed compositions, or vice versa, whenever analyses are infrequent or non existent. Analog PTLF signals are converted to digital signals and along with digital PTLF signals are input to the alignment system 318. The signals 109 are first limit checked and bounded at validity check 130. A first principles simulation 110 of the process is carried out on the computer using the reconciled flows and validated temperature, pressure, and level measurements 115, along with analytical determinations of the feed composition 119.

The process variable comparison module 312 determines the difference between the reconciled pressure and temperature signals 115 and the computed regulatory pressure and temperature signals 113, usually as an arithmetic difference, relative difference, or relative difference based on the logarithm of the ratio of the raw process variable signals 115 to the predicted process variable signals 113. This comparison produces a differential signal 315.

If the differential signal 315 is highly variable, then a moving average value of the difference is maintained by the filter 308 and updated each compute cycle. If the difference is fairly stable, then the difference 315 may pass unchanged through filter 308.

A second embodiment of the present invention uses the validated signal 111 as a direct input into process variable comparison 312, completely bypassing the flow data reconciliation 108.

The statistical filter 308 updates the value of the average error 309 and average variance for each computation cycle for each variable processed, using the same methods as the product property statistical filter module 404 (i.e., the filter first subtracts the previous filtered signal from the current signal to produce a measure of the variance, which is combined with the average variance to determine the deviation). The average error value 309 is used by the alignment module 318. The statistical filter 308 receives a signal each compute cycle.

The filtered difference 309 is then processed by an alignment module 316. The alignment module 316 provides a regulatory control adjustment 313 to the simulation models 110 so that they remain synchronized with the process operations by driving the process variable difference 315 and the filtered difference 309 toward zero. The preferred method for adjusting the model is through the use of a PID control procedure, although other types of control procedures may be used, if appropriate.

A simple example can be used to illustrate how the alignment function operates. Consider a binary distillation separation where there is a nearly equal molar mixture of the two components in the base of the column. The two components have significantly different boiling points, so that changes in composition at constant pressure are readily detected as changes in temperature. On the actual column the base pressure is held constant, while a controller adjusts the tails rate to maintain a constant base temperature, and thus, a constant composition.

The model that simulates this column sets the base temperature of the model equal to the base temperature of the process. The simulated base composition and pressure are then determined from the simulation. If the simulated composition is in error, then the calculated base pressure will not match the actual base pressure. To maintain the base pressure, and hence the base composition, aligned with the actual process an alignment controller is used to adjust the model tails flow to drive the difference between the base temperature of the model and that of the actual process to zero.

Since the base pressure measurement may be quite noisy and have a significant fixed error, it is processed through the statistical filter to eliminate the noise and obtain a reliable estimate of the true base pressure. Thus, with the model's base temperature and pressure both closely matching process conditions, and the estimated tails concentrations should closely track the actual concentrations.

At the top of the column the concentration of the high boiling component is so low that concentration changes cannot be detected by temperature changes. Overhead stream composition values from the model are provided directly to the overhead product property (stream composition) controller. In this case no alignment functionality is present and without a periodic analysis of the overhead stream, there is no way to calibrate the model or directly correct model composition estimates.

If, however, there are periodic measurements made of overhead and bottoms streams, then the calibration function can be used to both correct simulation model estimates and to adjust elements of the model so as to drive the difference between computed and measured concentrations toward zero.

In the case of the overhead stream, the estimated concentration of the high boiling component may be directly adjusted with the moving average composition error term before being introduced into the overhead product property controllers. The same error term can be utilized as input to a calibration controller that adjusts the model value of tray efficiency above the feed point on the column as a way to cause measured and computed composition values in the overhead stream to match.

Likewise, the measure of tails composition can be compared with the computed value and a moving average error determined that can be used directly to correct the estimated composition before sending it to the bottoms product property (composition) control. The same moving average error could also be used as input to a calibration controller that adjusts the tray efficiency below the feed tray to drive the moving average error towards zero.

Finally, the bottoms moving average composition error might be used to adjust the setpoint of the alignment controller. If for example, the pressure reading has a significant fixed error, a calibration controller can be used to place a bias in the setpoint of the alignment controller to correct for the error. Thus, a continuous, but noisy pressure measurement with a fixed error can be used to maintain the model in alignment with the process. This approach is particularly useful if the base of the column is sampled infrequently, so that the samples are inadequate to provide the degree of calibration necessary to successfully track the mils composition between analyses.

This example illustrates how the models in conjunction with the calibration and alignment functions can be used in various combinations to improve the estimates of stream composition and/or product properties provided the product property controllers.

The combination of the alignment 318 and the calibration and product property corrector 408 systems is to improve the composition/product property estimates in several ways.

First, the alignment function 318, where process measurements are linked to product properties and/or stream compositions, maintains models in alignment with the process where composition analyses are unavailable or infrequent.

Second, the calibration and product property corrector system produces artificial analyses to augment the normal analysis set. This increases the number of calibration points throughout the model and enhances the ability of the models to adapt to changing conditions automatically.

Third, the product property comparison can utilize alternative methods to determine errors. The use of errors determined in different forms can be utilized to linearize the relationship between the error and the response of the model to the variable or parameter manipulated by the calibration controllers, and thus provide more accurate and effective control of the models.

Fourth, the statistical filter provides a means for effectively utilizing laboratory and analyzer data to detect and eliminate the impact of bad analytical results. By effectively smoothing laboratory results relative to model results, the latest filtered difference can be applied directly to correcting model output with much less risk of upsetting process operations due to a bad analysis.

Fifth, by providing the filter the ability to adapt to process shifts and protect itself against gross errors, greatly enhances the accuracy and reliability of product property estimates.

Sixth, The calibration controllers can be tuned so that they recalibrate the model slowly enough to minimize the impact of calibration effects on plant operations.

The various elements of the invention can be used individually or in combination.

Not shown in the figures is an optional historical database. The historical database maintains a history of raw flow sensor signals 109, analytical values 119, and may optionally store a history of corrected flow values 115, predicted product property signals 117, or any of the other signal values of the present invention. The historical database can serve as a data buffer providing data to the invention. It can also provide historical data which may be used by the present invention for various enhanced signal processing tasks. An historical database is used in the preferred embodiment, but functions largely as a data buffer, and thus is not essential to the invention or the preferred embodiment.

III. Sequence of Modules

The process autopilot carries out all its functions in a cycle, executed at a fixed time interval, with idle time passing until the next cycle. During each cycle, the processes of the various modules are carried out in sequence.

On the first cycle, when no previous computed values are available, the autopilot initializes by executing the process simulation models 110 using pre-defined estimates for all sensor values. This provides a starting point from which the simulation will converge cycle-by-cycle to eventually align with the process.

Then, whether the first or later cycle, the validity check 130 executes. Then the flow data reconciliation 108 is executed using validated raw sensor measurements 111 with previously determined corrected product property signals 401, computed regulatory variables 113, and predicted product property signals 117, to produce corrected flow signals 115.

On each cycle product property transform 414 executes if new lab or analyzer data is available or if stream composition and/or product property values are to be synthesized from reconciled flow measurements. Then product property comparison 410, statistical filter for product properties 404 and calibration 406 are carried out. This corrects for drift of predicted product property signals 117 from the product property signals 119.

Also, at each cycle, process variable comparison 312, statistical filter for process variables 308 and alignment 316 are carried out. This also corrects for drift of predicted product property signals 117 from the product property signals 119.

The product property corrector 402 is then executed to produce the desired corrected product property signals 401. Then, product property controllers 240 are provided with the predicted product property signals 401. The simulation models 110 are then executed to produce estimates for the next cycle.

Product property controllers 240 operate on their own cycle, and may be synchronized with the provision of updated predicted product property signals 401, or may function synchronously using the latest predicted product property signals 401, repeatedly if needed. PTLF controllers 250 operate independently of the autopilot or the product property controllers 240. Whenever a product property controllers 240 provides a new setpoint 245, the PTLF controller 250 continue their independent operation using the new setpoint.

While the invention has been particularly shown and described with reference to preferred embodiments thereof, it will be understood by those skilled in the art that various changes in form and details may be made therein without departing from the spirit and scope of the invention.

What is claimed is:

1. A computer-based method for processing stream composition and/or product property estimates generated from dynamic process models, said stream composition and/or product property estimates used to control a physical process, comprising the steps of:
   (1) measuring, in a process comprising one or more units and two or more streams, pressure, temperature, and flow of said streams to produce raw process variable signals;
   (2) comparing said current raw process variable signals with previously predicted process variable signals to determine error measures;
   (3) using said error measures to adjust the dynamic process models to reduce future estimates of said error measures;
   (4) predicting future process variable signals and future stream composition and/or product property signals from the dynamic process models;
   (5) using said predicted future stream composition and/or product property values to directly or indirectly change the state of a control element(s) of said process; and
   (6) operating said process using said control element(s) to produce a product.

2. The computer based method of claim 1, wherein said current raw process variable signals are first processed to eliminate gross errors and provide improved estimates of the true values of said current raw process variable signals before comparing said improved estimates of the true values with said previously predicted process variable signals.

3. The computer-based method of claim 1, wherein said error measures are determined by comparing said current raw process variable signals with said previously predicted process variable signals to determine arithmetic errors.

4. The computer-based method of claim 3, wherein said error measures are determined by comparing said current raw process variable signals with said previously predicted process variable signals to determine relative errors based on said arithmetic errors divided by the range of said current raw process variable signals.

5. The computer-based method of claim 3, wherein said error measures are determined by comparing said current raw process variable signals with said previously predicted process variable signals to determine relative errors based on said arithmetic errors divided by the measured or calculated values.

6. The computer-based method claim 1, wherein said error measures are determined by comparing said current raw process variable signals with said previously predicted process variable signals to determine relative errors based on the logarithm of the ratio of said current raw process variable signals to said previously predicted process variable signals.

7. The computer-based method of claim 1, further comprising the steps of:
   using said error measures as input to a controller; and using said controller to adjust independent model variables in said model to reduce future estimates of said error measures.

8. The computer-based method of claim 1, further comprising the steps of:
comparing said error measures with its moving average error to determine a variance;
comparing said variance with the moving average variance to determine a deviation;
using said deviation and a normal frequency distribution to determine a weighing factor for said error measures;
using said weighing factor, said error measures, and said moving average error to determine a new moving average error;
using said new moving average error as input to a controller; and
using said controller to adjust alignment factors in said model to reduce future estimates of said error measures.

9. The computer-based method of claim 8, further comprising the steps of:
determining the number of consecutive times said deviation exceeds a threshold with the same sign for said error measures to determine a count;
using an artificial deviation and the normal frequency distribution to determine a weighting factor for said error measures;
using said weighting factor, said error measures, and said moving average error to determine a new moving average error;
using said new moving average error as input to a controller; using said controller to adjust alignment factors in said model to reduce future estimates of said error measures.

10. The computer-based method of claim 9, wherein said artificial deviation is obtained by dividing said deviation by said count.

11. The computer-based method of claim 9, wherein said artificial deviation is obtained by multiplying said deviation by an amplification factor.

12. The computer-based method of claim 9, wherein said artificial deviation is obtained by multiplying said deviation by said amplification factor and dividing by said count.

13. The computer-based method of claim 8, further comprises the step of using said variance, said average variance, and a fixed weighting factor to determine a new moving average variance.

14. The computer-based method of claim 13, wherein said fixed weighting factor is adjusted by dividing by said deviation when said deviation exceeds a threshold.

15. The computer-based method of claim 1, further comprising the step of operating said process to create said current raw process variable signals.

16. A computer-based system for processing dynamic model generated stream composition and/or product property estimates, comprising:
(a) two or more sensors for producing raw pressure and temperature signals from two or more streams in a process comprising one or more units and two or more streams;
(b) one or more computer-based process dynamic models connected to receive limit checked pressure, temperature, and level signals, reconciled flows, feed composition signals, and model alignment factors, to produce predicted pressure and temperature signals and predicted stream composition and/or product property signals;
(c) a process variable comparison module connected to use said raw pressure and temperature signals and said predicted pressure and temperature signals to determine an error between said raw signals and said predicted signals;
(d) a statistical filter module connected to take said error and determine a new moving average error from the statistical history of said error;
(e) an alignment module connected to take said new moving average error and produce one or more model alignment factors and connected to adjust said one or more computer-based process dynamic models based on said one or more model alignment factors;
(f) a stream composition and/or product property controllers, connected to directly or indirectly use said predicted stream composition and/or product property signals as input, for producing a controller output signal in accordance with said input and a control objective; and
(g) an actuator connected to change one or more states of said process in accordance with said controller output signal.

17. A computer-based system for processing model generated stream composition and/or product property estimates, comprising:
two or more sensors for producing raw stream composition and/or product property signals from two or more streams in a process comprising one or more units and two or more streams;
one or more computer-based process models connected to receive reconciled flows and pressure, temperature, and level signals, said raw stream composition and/or product property signals, and model calibration factors, and produce predicted stream composition and/or product property signals;
a product property transform module connected to use said reconciled flows, said raw stream composition and/or product property signals, and said predicted stream composition and/or product property signals to produce artificial stream composition and/or product property signals for streams lacking raw stream composition and/or product property signals;
a product property comparison module connected to use said raw stream composition and/or product property signals, said artificial stream composition and/or product property signals, and said predicted stream composition and/or product property signals to determine an error between said raw signals and said predicted signals;
a statistical filter module connected to take the said error and determine a new moving average error from the statistical history of said error;
a calibration module connected to take the said new moving average error and produce model calibration factors for adjusting said process models; and
a product property corrector module connected to take said new moving average error and said predicted stream composition and/or product property signals and apply said new moving average error to said predicted stream composition and/or product property signals to produce a corrected stream composition and/or product property signal.

18. The computer-based system of claim 3, further comprising a controller, for changing a state of a final control element of said process, connected directly or indirectly to use said predicted stream composition and/or product property signals as inputs, and connected to change said state in accordance with an operating objective.

19. The computer-based system of claim 17, wherein said system further comprises:
a stream composition and/or product property controllers, connected to directly or indirectly use said predicted stream composition and/or product property signal as input, for producing a controller output signal in accordance with said input and a control objective; and
an actuator for changing the state of the process, connected to change said state in accordance with said controller output signal.

20. A computer-based method for processing dynamic model generated stream composition and/or product property estimates, comprising the steps of:
(1) measuring, in a process comprising one or more units and two or more streams, stream composition and/or product property signals of said streams to produce raw stream composition and/or product property signals;
(2) comparing said raw stream composition and/or product property signals with previously predicted stream composition and/or product property signals to determine an error measure;
(3) using said error measure to adjust dynamic process models to reduce future estimates of said error measure;
(4) predicting, using said dynamic process models, future process stream composition and/or product property signals for one or more of said streams;
(5) using said predicted future stream composition and/or product property values to directly or indirectly change the state of a control element(s) of said process; and
(6) operating said process using said control element(s) to produce a product.

21. The computer-based method of claim 20, further comprising the steps of:
comparing said error measure with its moving average error to determine the variance;
comparing said variation with the moving average variance to determine the deviation;
using said deviation and the normal frequency distribution to determine a weighing factor for said error measure;
using said weighing factor, said error measure, and said moving average error to determine a new moving average error;
using said new moving average error as input to a controller;
using said controller to adjust calibration factors in the said model to reduce future estimates of said error.

22. The computer-based method of claim 21, further comprising the steps of:
determining the number of consecutive times said deviation exceeds a threshold with the same sign for said error measure to determine a count;
using an artificial deviation and the normal frequency distribution to determine a weighting factor for said error measure;
using said weighting factor, said error measure, and said moving average error to determine a new moving average error;
using said new moving average error as input to a controller;
using said controller to adjust alignment factors in said model to reduce future estimates of said error measure.

23. The computer-based method of claim 22, wherein said artificial deviation is obtained by dividing said deviation by said count.

24. The computer-based method of claim 22, wherein said artificial deviation is obtained by multiplying said deviation by an amplification factor.

25. The computer-based method of claim 22, wherein said artificial deviation is obtained by multiplying said deviation by said amplification factor and dividing by said count.

26. The computer-based method of claim 21, further comprises the step of using said variance, said average variance, and a fixed weighting factor to determine a new moving average variance.

27. The computer-based method of claim 26, wherein said fixed weighting factor is adjusted by dividing by said deviation when said deviation exceeds a threshold.

28. The computer-based method of claim 20, wherein said error measure is determined by comparing said raw stream composition and/or product property signals with said predicted stream composition and/or product property signals to determine an arithmetic error.

29. The computer-based method of claim 20, wherein said error measure is determined by comparing said raw stream composition and/or product property signals with said predicted stream composition and/or product property signals to determine a relative error based on the arithmetic difference divided by the range of said raw stream composition and/or product property signals.

30. The computer-based method of claim 20, wherein said error measure is determined by comparing said raw stream composition and/or product property signals with said predicted stream composition and/or product property signals to determine a relative error based on the arithmetic difference divided by the measured or calculated composition and/or product property signals.

31. The computer-based method of claim 20, further comprises the step of determining a relative error based on the logarithm of the ratio of said raw stream composition and/or product property signals to said predicted stream composition and/or product property signals.

32. The computer-based method of claim 20, wherein said current raw stream composition and/or product property measurements may be obtained from continuous signals or may refer to measurements on samples taken more than one computer cycle in the past, wherein said predicted future stream composition and/or product property values refer to values computed immediately prior to taking samples, the frequency of sampling for said stream composition and/or product property measurements may be fixed or variable, and a delay between sampling and transmission of measured values may be fixed or variable.

33. The computer-based method of claim 20, further comprising the step of operating said process to create said raw stream composition and/or product property signals.

* * * * *